US012645905B2

(12) United States Patent　　(10) Patent No.:　US 12,645,905 B2
Sakarya　　　　　　　　　　　　　(45) Date of Patent:　　　Jun. 2, 2026

(54) VISUAL BASED ROBOT LANGUAGE FOR INDUSTRY 4.0 APPLICATIONS

(71) Applicants:YILDIZ TEKNIK UNIVERSITESI, Istanbul (TR); YILDIZ TEKNOLOJI TRANSFER OFISI ANONIM SIRKETI, Istanbul (TR)

(72) Inventor: Ufuk Sakarya, Istanbul (TR)

(73) Assignees: YILDIZ TEKNIK UNIVERSITESI, Istanbul (TR); YILDIZ TEKNOLOJI TRANSFER OFISI ANONIM SIRKETI, Istanbul (TR)

( * ) Notice: Subject to any disclaimer, the term of this patent is extended or adjusted under 35 U.S.C. 154(b) by 0 days.

(21) Appl. No.: 19/114,470

(22) PCT Filed: Mar. 8, 2023

(86) PCT No.: PCT/TR2023/050225
§ 371 (c)(1),
(2) Date: Mar. 24, 2025

(87) PCT Pub. No.: WO2024/063722
PCT Pub. Date: Mar. 28, 2024

(65) Prior Publication Data
US 2026/0141204 A1　　May 21, 2026

(30) Foreign Application Priority Data
Sep. 23, 2022　(YE) ................................ 2022/014689

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01); *G06K 19/06046* (2013.01)

(58) Field of Classification Search
CPC ....... G06K 19/06037; G06K 19/06046; G06K 7/1417
(Continued)

(56) References Cited

U.S. PATENT DOCUMENTS 5,399,846 A　　3/1995　Pavlidis et al.
2016/0187878 A1　6/2016　Khorsheed et al.
(Continued)

FOREIGN PATENT DOCUMENTS

CN　　105894069 A　　8/2016
CN　　106951945 A　　7/2017
CN　　109784119 A　　5/2019

OTHER PUBLICATIONS

Duygu Arslan, et al. Comparison of Line Barcode Systems and HCCB Barcode System, Academic Informatics'10—Proceedings of the XII. Academic Informatics Conference Feb. 10-12, 2010 Mula University, 2010, pp. 393-398.
(Continued)

*Primary Examiner* — Paultep Savusdiphol
(74) *Attorney, Agent, or Firm* — Bayramoglu Law Offices LLC

(57) ABSTRACT

The provided is a method for generating and reading visual code. Some visual code objects that can be obtained by this method are also described. The method can provide high data density and high readability coding by using code lines generated on a pattern having the shape of a letter "U" recognisable by robots.

8 Claims, 1 Drawing Sheet

(58) Field of Classification Search
USPC ................................................. 235/487, 494
See application file for complete search history.

(56) References Cited

U.S. PATENT DOCUMENTS

| | | | |
|---|---|---|---|
| 2018/0060629 A1* | 3/2018 | Heath | .............. G06K 19/06028 |
| 2018/0121758 A1* | 5/2018 | Betts-Lacroix | ........ G06V 40/10 |

OTHER PUBLICATIONS

Aysel Sanal, et al., Evaluation of Usage and Application Areas of Qr Codes in Service Industry, Business & Management Studies: An International Journal, 2017, pp. 172-189, vol. 5 Issue.4.

* cited by examiner

VISUAL BASED ROBOT LANGUAGE FOR INDUSTRY 4.0 APPLICATIONS

CROSS-REFERENCE TO THE RELATED APPLICATIONS

This application is the national phase entry of International Application No. PCT/TR2023/050225, filed on Mar. 8, 2023, which is based upon and claims priority to Turkish Patent Application No. 2022/014689, filed on Sep. 23, 2022, the entire contents of which are incorporated herein by reference.

TECHNICAL FIELD

This invention relates to a robot language for communicating visual data and commands to robots, and in particular to a method of generating and reading visual code. Some visual code objects that can be obtained by this method are also described.

BACKGROUND

Within Industry 4.0 applications, barcodes (D. Arslan, V. Atasever, E. Güvenoğlu, Ş. Z. Erdoğan, "Comparison of Line Barcode Systems and HCCB Barcode System", Akademik Bilişim'10-XII. Proceedings of Academic Informatics Conference, 10-12 Feb. 2010 Muğla University.) and labels generate with QR codes (Sanal, A., & Öztürkoğlu, Y. (2018). Evaluation of Usage and Application Areas of QR Codes in Service Industry. Business & Management Studies: An International Journal, 5 (4), 172-189. https://doi.org/10.15295/bmij.v514.180) can be used to provide visual commands to robots in areas such as all factories and production facilities, logistics service centres, storage areas, other service sector activity areas, defence-oriented sea, air and land platforms where robots are used. Similarly, these codes can also be used to transmit information and warnings to users via personal portable devices such as smartphones and smartwatches. In addition to visible wavelengths, these codes can reflect or radiate radiation at wavelengths such as near infrared and near ultraviolet, which can be used in a similar way. With the increase in the size of the data that can be transferred by barcodes and QR codes, the complexity of these codes increases and the correct readability of these codes decreases, especially by robots working in large areas and reading in motion.

In document US2018060629A1, a coding method is described which allows coding on both sides of a centre line. In this method, coding is performed by arranging multiple intervals of different sizes in succession.

In document U.S. Pat. No. 5,399,846A, a barcode is described which is based on the combination of one-dimensional codes arranged in the form of multiple lines. Although it is also stated that different lines can have different heights, the heights are only related to the reader resolution and the amount of data to be fit into the space. According to this document, a two-dimensional barcode can be generated.

In document CN105894069A, a two-dimensional code generation method for navigation applications is described. In particular, the correct reading of the code is emphasised. In this direction, two frames with high contrast difference and nested around the code are generated. As an example, a code with 5×5 dimensions and a total of 25 bits of data is presented. The 4 bit part is used for CRC control.

In document CN106951945A, a method is described for providing a second dimensional encoding area with cuts positioned on the lines of a barcode. Thus, a second dimension of coding is provided on the barcode pattern.

In the light of the state of the art, there seems to be a need for the development of visual codes that provide high readability while enabling the coding of high complexity instructions.

SUMMARY

Objectives of the Invention

The object of the invention is the development of a robot language, in particular a method of generating and reading visual code, and visual code objects obtained therefrom, for the transmission of visual data and commands to robots.

Another object of the invention is the development of a method of generating and reading visual code, which allows the generation of visual code objects with high readability.

A further object of the invention is the development of a method for generating and reading visual code, which allows the generation of visual code objects with high coding density.

Short Description of Invention

With this invention, a method and visual code objects suitable for this method have been developed that enable coding with code lines formed on a pattern having the shape of a letter "U" recognisable by robots. The form of coding with code lines can be coded using the ratio of an auxiliary line positioned at one corner of the letter "U" to the sides of the letter "U". Thus, data of varying sizes can be coded on this letter "U" according to the same principles.

BRIEF DESCRIPTION OF THE DRAWINGS

The visual code objects developed within the scope of the objectives of the present invention are shown in the accompanying figures.

Figures 1, 2, 3, 4, 5, 6:
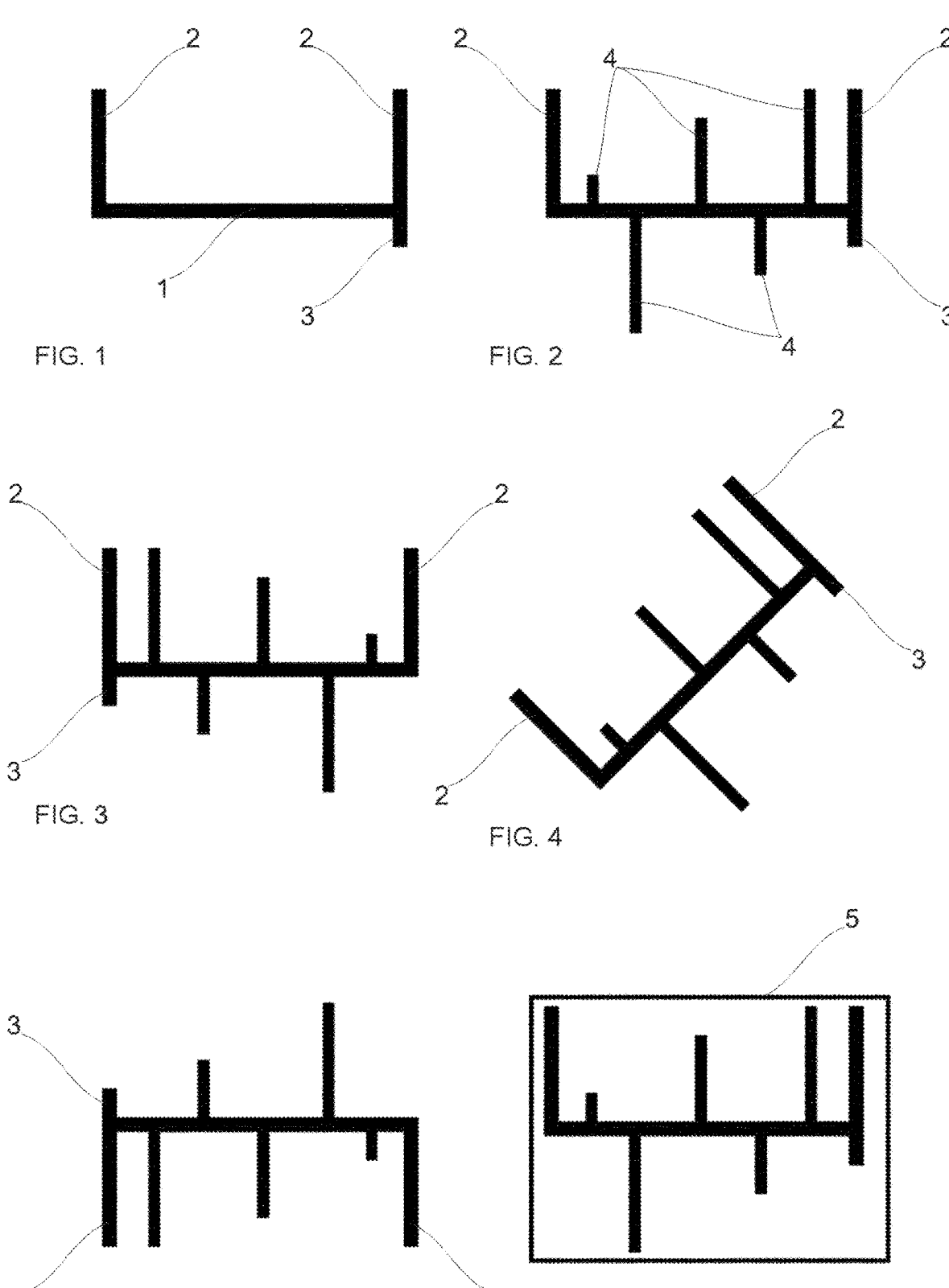
FIG. 1 is an example visual code object obtained according to the invention.
FIG. 2 is an example visual code object obtained according to the invention.
FIG. 3 is a visual code object obtained according to the invention, which carries the same data as in FIG. 2.
FIG. 4 is a visual code object obtained according to the invention, which carries the same data as in FIG. 2.
FIG. 5 is a visual code object obtained according to the invention, which carries the same data as in FIG. 2.
FIG. 6 is a framed visual code object obtained according to the invention, which carries the same data as in FIG. 2.

The parts in the figures are numbered one by one and the equivalents of these numbers are given below.

1. Centre line
2. Boundary line
3. Auxiliary line
4. Code line
5. Frame

DETAILED DESCRIPTION OF THE EMBODIMENTS

The inventive method of generating and reading visual code is essentially used for visually encoding data using a two-dimensional visual code object, comprising the following;

a centre line (1), two boundary lines (2) of the same length at either end of the centre line (1), which together with the centre line (1) form the shape of the letter "U", an auxiliary line (3) at one or both ends of the centre line (1) and code lines (4) located between the boundary lines (2) and on the centre line (1)

The ratio (n) of the length ($L_{max}$) of the boundary line (2) and the length ($L_{unit}$) of the auxiliary line (3) defines the way the data is encoded in the code lines (4). In particular, the value of n defines the base on which the data is encoded in the code lines (4).

During the generation of a visual code object by the inventive method, the following steps are carried out;

Choosing n×2 value equal to the base in which the data will be encoded,

Generating the auxiliary line (3) of length $L_{units}$ with $L_{max}=n \times L_{units}$, Generating code lines (4) of length $m \times L_{units}$ for each code line (4), each corresponding to an element of the data, where n≥|m| and m is an integer, such that the value of m matches the value of the corresponding element in base n×2

Here, positive and negative values of m distinguish on which side of the centre line (1) the respective code line (4) lies.

Similarly, the method of the invention performs the following steps during the reading of a visual code object;

Measuring the value of n and calculating the value of n×2,

Measuring the length of each code line (4) in the form of $m \times L_{units}$, where n≥|m| and m is an integer, For each code line (4), determining the value of the corresponding element in the n×2 base that matches the value of m The data encoded visually with the visual code object can be a sequence of single-digit numbers (single-digit by base, e.g. the number E in the 16-digit system) or a multi-digit number.

In order to generate a visual code object according to the invention, a code line (4) corresponding to each element of the data is generated such that the auxiliary line (3) is m times the size of the element in base n. The code lines (4) are ordered between the boundary lines (2) in accordance with the order of the corresponding elements in the data.

In order to generate the visual code object, the inventive visual code generation and reading method is carried out on a computer and the visual code object components corresponding to the data to be encoded are determined. Again, by means of an image forming device such as a display screen, a panel containing a two-dimensional LED array, or an image forming device such as a printer operated by the said computer, the specified visual code object components are produced in a displayable form and the visual code object is generate. While visual code objects generate by an image forming device such as a printer are immutable, visual code objects generate by image forming devices such as a display or a panel containing an LED array can be changed over time and allow changing data to be transferred.

In order to increase readability, the centre line (1), border lines (2) and auxiliary line (3) can be thicker than the code lines (4). Thus, visual code objects can be generate that are resistant to blurring and distortion that may occur during reading by a robot in motion or looking at the visual code object at an angle.

For the reading of a visual code object according to the invention, a value n is found which is the ratio of the lengths of the boundary lines (2) and the auxiliary line (3). Then, the m values indicating the ratio of the lengths of all code lines (4) and the auxiliary line are found. By sorting the m values in the same order as the relevant code lines (4), the visual code object coded with the visual code object can be obtained in a numerical form.

The inventive method of generating and reading visual code for reading the visual code object is carried out on a computer, in particular an embedded computer on a robot to be controlled, or an external computer connected to such a robot, and determines the data corresponding to the visual code object components by reading the visual code object components by means of a camera. With the objective of reading the components of the visual code object, ratios can be calculated by measuring the actual dimensions of the components that can be determined with the help of a reference or by measuring the apparent dimensions of the components, or the ratios between the components can be measured directly by taking one of the components as a reference.

Visual code objects can be generate and read primarily at visible wavelengths, near infrared wavelengths or near ultraviolet wavelengths. For this objective, image forming devices operating at the relevant wavelengths or cameras operating at the relevant wavelengths with materials reflecting the relevant wavelengths can be used. The use of visible wavelengths allows visual code objects to be detected by humans and human-controlled robots to be guided. Near infrared wavelengths enable visual communication without generating visual pollution for people. Although single band systems are sufficient for the application of the invention, it is also suitable for use with multi-band systems.

An example visual code object obtained according to the invention is shown in FIG. 1. In this example, the n value is set to 4. If a low n value is chosen, the tolerance against errors to be encountered in imaging increases and readability is improved. If a high value of n is chosen, the size of the encodable data is increased. The choice of the value of n is determined according to the readability and data density requirements of the field of use of the invention.

In a preferred embodiment of the invention, the number of code lines (4) positioned between the boundary lines (2) is also fixed and the code lines (4) are equally spaced on the centre line (1). Thus, the number of elements of the encoded data can be increased to withstand errors that may be encountered during reading.

Another example of a visual code object according to the invention is shown in FIG. 2. In this example, the value of n is 4 and the number of code lines (4) between the boundary lines (2) is chosen as 5. In this visual code object, the m values for the code lines (4) are measured as 1, −4, 3, −2 and 4 respectively. Accordingly, on the centre line (1), the values 4, 0, 6, 2 and 7 in base 8 are encoded respectively. The value $(40627)_8$ can be used directly or converted to another base, for example the value 16791 in base 10 can also be used by the robot. Thus, a data obtained can be used to retrieve a stored information or command on the robot or at an external location. In this example, $(77777)_8+(1)_{10}=(32768)_{10}$ different codes can be generated.

With another example visual code object according to the invention, where the value is 2 and the number of code lines (4) between the boundary lines (2) is 3, $(333)_4+(1)_{10}=(64)_{10}$ different codes can be generate. Although fewer codes can be generate, a high tolerance for error can be achieved with this example.

The position and number of the auxiliary line (3) in the robot language according to the letter "U" can also be used to increase the coding capacity obtained according to the invention. In the examples given in FIG. 1 and FIG. 2, the auxiliary line (3) is located only on the lower right side of the letter "U". The invention also provides for two other coding formats.

The auxiliary line (3) can be located only on the left side of the letter "U" or both on the left and right side. These 3 different cases correspond to different codes for the same n and m values, tripling the code capacity generated according to the selected n and m values. Thanks to these 3 different uses of the auxiliary line (3), the code capacity of the example given in FIG. 2 can be increased from 32768 to 98304. In cases with high code count requirements, higher capacity can be achieved by using these 3 different cases of the auxiliary line (3). In cases where code capacity is not required but reliability is more important, the automatic detection of the letter "U" can be facilitated by using only one state of the auxiliary line (3) for easier reading of the codes by the computer. In such a case, the use of the auxiliary line (3) on both the left and right side of the letter "U" will be more beneficial in terms of ease of reading and accuracy.

In one embodiment of the invention, a frame (5) surrounding the visual code objects may be used for easier detection and easier reading of the visual code objects by robots. The frame (5) can provide ease of perception by providing contrast with the background, or multiple independent coding applications can be utilised in the same environment by using frames (5) with different wavelengths.

In one embodiment of the invention, one or more of the code lines (4) are used for coding a control step. In such an embodiment, error coding can be used to compromise overall capacity and increase reliability.

The boundary lines (2) on the visual code objects also define the order of the code lines (4) and thus the coding process. The letter "U" formed by the centre line (1) and the boundary lines (2) can be recognised by robots using artificial intelligence techniques and the sequence can be determined correctly. Thus, visual code objects can also be read when viewed from different angles, for example, visual code objects that have a random orientation with respect to the robot can also be read correctly by flying robots.

The programmes used in both the code generation and code reading stages of the inventive method can be developed to be suitable for use for different coding criteria and to be highly reusable.

Thanks to the robot language used according to the method of the invention, which provides visual data transmission to robots through the visual code objects described above, communication problems can be overcome, especially in cases where a large number of robots work in limited areas, and in the field of defence, it can be ensured that swarm UAVs can be managed within the chain of command.

Although the invention is particularly described with robots, it can also be used with a device that allows the automation of any process. For example, micro-robots in the form of accessories to be worn on the arms of customers in hotels can be used to provide guidance and warning information to customers. Portable personal electronic devices such as smart phones and smart watches can also be used in a similar way.

What is claimed is:

1. A method of generating and reading a visual code executed on at least one computer for visually encoding a data using a two-dimensional visual code object generated by at least one image forming device and read by at least one camera, wherein a ratio of a length $L_{max}$ of a boundary line and a length $L_{unit}$ of an auxiliary line defines a way where the data is encoded in code lines comprising a centre line, two boundary lines of an identical length at either end of the centre line, an auxiliary line at one or both ends of the centre line, the code lines located between the two boundary lines and on the centre line, wherein the two boundary lines together with the centre line form a shape of a letter "U".

2. The method according to claim 1, wherein a value n identifies a base where the data is encoded in the code lines.

3. The method according to claim 2, comprising the following steps executed during generation of the two-dimensional visual code object;

choosing n×2 value equal to the base where the data will be encoded, generating the auxiliary line of length $L_{units}$ with $L_{max}$=n× $L_{units}$, generating the code lines of length m×L units for each code line, each corresponding to an element of the data, where n≥|m| and m is an integer, wherein a value of m matches a value of a corresponding element in the base n×2.

4. The method according to claim 2, comprising the following steps carried out during reading of the two-dimensional visual code object;

measuring the value of n and calculating a value of n×2, measuring a length of each of the code lines in a form of m×L units, where n≥|m| and m is an integer, for each of the code lines, determining a value of a corresponding element in an n×2 base that matches a value of m.

5. The method according to claim 1, wherein cases where the auxiliary line is located at different ends and at both ends of the centre line correspond to different codes.

6. The method according to claim 5, wherein a frame surrounds the two-dimensional visual code object.

7. The method according to claim 1, wherein at least one of the code lines is configured for encoding a control step.

8. The method according to claim 7, wherein a frame surrounds the two-dimensional visual code object.

* * * * *